United States Patent [19]

Murakami et al.

[11] Patent Number: 4,967,276
[45] Date of Patent: Oct. 30, 1990

[54] VIDEO SIGNAL MIXING DEVICE FOR INFRARED/VISIBLE INTEGRATED IMAGING

[75] Inventors: Yoshishige Murakami; Kanji Hirota; Masaaki Nakamura, all of Kawasaki, Japan

[73] Assignee: Fujitsu Limited, Kawasaki, Japan

[21] Appl. No.: 356,199

[22] Filed: May 24, 1989

[30] Foreign Application Priority Data

May 24, 1988 [JP] Japan ................ 63-127868

[51] Int. Cl.⁵ .................... H04N 5/272; H04N 5/33
[52] U.S. Cl. .................... 358/183; 358/113; 250/330
[58] Field of Search ............ 358/113, 183, 171; 250/330, 332, 349

[56] References Cited

U.S. PATENT DOCUMENTS

| 4,524,386 | 6/1985 | Scott | 358/113 |
| 4,608,599 | 8/1986 | Kaneko et al. | 358/113 |
| 4,679,068 | 7/1987 | Lillquist et al. | 358/44 |
| 4,751,571 | 6/1988 | Lillquist | 356/330 |
| 4,759,072 | 7/1988 | Yamane et al. | 358/113 |
| 4,843,561 | 6/1989 | Larson | 358/113 |

Primary Examiner—John K. Peng
Attorney, Agent, or Firm—Staas & Halsey

[57] ABSTRACT

A infrared/visible integrated imaging apparatus having a video signal mixing device for superimposing a visible video signal upon an infrared video signal. The mixing device has a discriminating circuit setting electrical discrimination between an infrared video signal having a level higher than a predetermined black level and having a lower than the predetermined black level. The visible video signal simultaneously output with the infrared video signal having the level higher than a predetermined black level is practically cut off with a visible video signal selecting circuit. The partially cut off video signal is then superimposed on the thermal video signal for display. The level of each of the two video signals is independently controllable.

13 Claims, 5 Drawing Sheets

FIG. 4
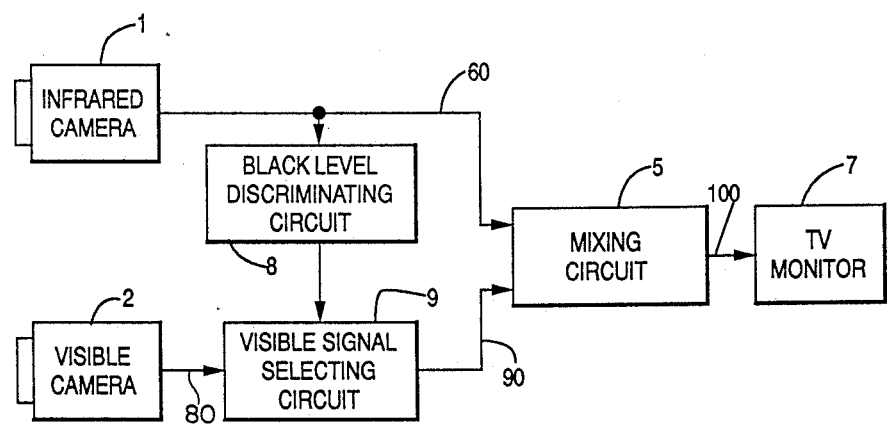
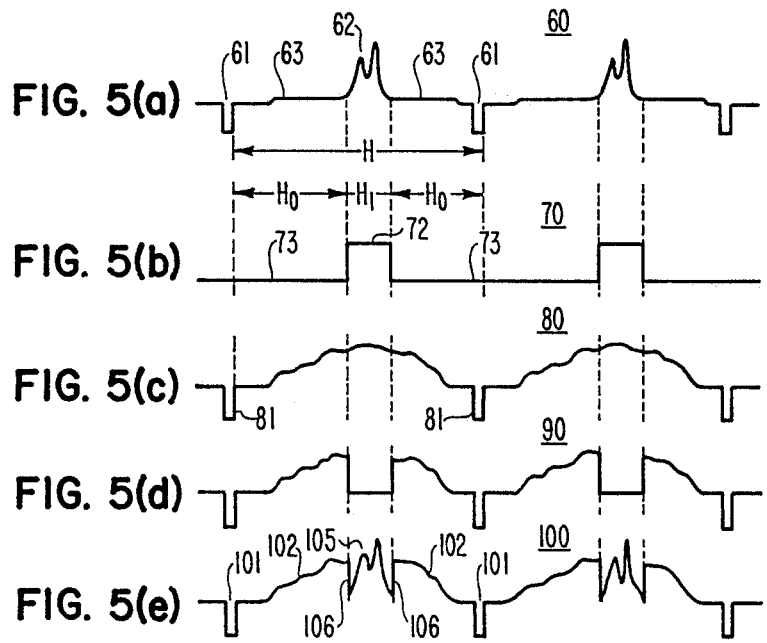
FIG. 5(a)
FIG. 5(b)
FIG. 5(c)
FIG. 5(d)
FIG. 5(e)

VIDEO SIGNAL MIXING DEVICE FOR INFRARED/VISIBLE INTEGRATED IMAGING

BACKGROUND OF THE INVENTION

1. Field of the Invention

The present invention relates to an infrared/visible integrated imaging apparatus for composing an infrared image with a visible image. In particular, it relates to a video signal mixing device employed in the imaging apparatus for superimposing a visible video signal produced by a visible camera upon an infrared video signal produced by an infrared camera.

2. Description of the Related Art

Infrared radiation is produced by any object having a temperature. Since the infrared radiation is not visible to the human eye, detection thereof requires some physical device such as a thermographic system in which an infrared camera, in conjunction with image processing devices, converts the invisible infrared radiation to a voltage signal which can be viewed directly on a television-like display. The thermographic system has a wide range of applications. For example, in a monitoring system for monitoring extensive areas, such as an electric power generating station or a liquefied natural gas (LNG) storage facility, using infrared cameras, very small changes in temperature in the field of view of the cameras can be detected and displayed on a monitor screen. This monitoring system is applicable to detect a hot spot, namely, a portion with an unusual change of temperature which may indicate an early stage of an accident in the extensive area.

In such a monitor system, there is widely used an infrared/visible integrated camera which combines infrared and visible camera functions. An object to be monitored is viewed along a common optical axis for both infrared and visible observation. This makes it possible to display a composite image composed of visible and infrared images at desired brightness proportions on the same screen. This setup provides more accurate information where the trouble is and how bad it is, than systems separately using a visible camera and an infrared camera. In order to electrically combine an infrared image signal (hereinafter an infrared video signal) with a visible image signal (hereinafter a visible video signal) to form a composite picture, a video signal mixing device is indispensable.

Such an infrared/visible integrated imaging apparatus is disclosed, for example, in Unexamined Japanese Patent Applications No. 52-26268, published on Feb. 26, 1977, proposed by Y. Nakayama, and No. 60-35882, published on Feb. 23, 1985, proposed by Y. Okumura.

FIG. 1 is a block diagram illustrating an example of prior art video signal mixing devices. An infrared camera 1 and a visible camera 2 output an infrared video signal and a visible video signal respectively with respect to the same object (not shown) to be observed. Both cameras 1 and 2 are arranged at positions adjacent to each other to have a common optical axis along which the cameras are focused to the object. The signal levels of the outputs from both cameras are adjusted through an infrared video signal level adjusting circuit 3 and a visible video signal level adjusting circuit 4 with a single control using ganged variable resistors disposed in a level control circuit 6; The adjusted video signals are added to each other through a mixing circuit 5, and converted to a composite signal which is displayed as a composite image of the object on the screen of a TV (television like) monitor 7.

In general, the brightness of an image displayed on the screen of a TV monitor is proportional to the input level of a video signal applied to the TV monitor. A video signal at a high level exceeding a threshold voltage, which is standardized to be 1 volt in Japan, results in an image with an excessive brightness, namely a whitish image. The brightness of the image is saturated with respect to a video signal having a further higher level exceeding the threshold voltage. Hence, the peak level of any video signal should be restricted below the threshold voltage. In contrast, a video signal having a substantially low level, produces a dark image. A specified voltage, below which the resulting image on the screen is invisible, namely a black image, is referred to as a black level. The black level is usually variable and is set to meet the requirement of the user of the apparatus.

In the imaging apparatus, all the infrared images and visible images displayed on the screen of the TV monitor 7, are produced by video signals being scanned line by line like a typical television display. FIG. 2(a) to FIG. 2(c) are prior art diagrams illustrating the waveforms of video signals at different points of the block diagram of FIG. 1. The diagrams illustrate waveforms of infrared and visible video signals for controlling an electron beam of a TV tube (a cathode ray tube) of the TV monitor 7, to repeatedly sweep the beam across the screen of the relevant TV tube. In the diagrams, the video signal level is represented on the (Y-axis) and the signal transmission time for horizontal scanning is taken on the abscissa. One horizontal scanning time interval is represented by H. FIG. 2(a) shows an infrared video signal 30 output from the infrared video signal level adjusting circuit 3. The infrared video signal 30 is composed of a horizontal synchronizing signal 31, an infrared profile signal 32 indicating a high temperature portion of the object, and a black level signal 33 indicating a substantially low temperature portion of the object. FIG. 2(b) shows the waveform of a visible video signal 40 output from the visible video signal level adjusting circuit 4. The visible video signal 40 contains a horizontal synchronizing signal 41, and a visible profile signal 42 indicating an ordinary optical image of the object. FIG. 2(c) shows the waveform of a composite signal 50 output from the mixing circuit 5, being composed of a horizontal synchronizing signal 51, and a composite profile signal 52.

The infrared video signal and the visible video signal are simply superimposed one on the other, making the abovedescribed composite profile signal 52 of FIG. 2(c). The peak level of the composite profile signal 52 is required to be limited below the threshold voltage to achieve a clear and bright image favorable to be observed. As a result, the level of each infrared video signal 30 and that of the visible video signal 40 are further restricted, causing an undesirable image as described later.

The level control circuit 6 including the ganged variable resistors has the advantage that the composite signal 50 composed of an infrared video signal 30 and a visible video signal 40 never exceed the threshold voltage, which is described next.

FIG. 3 is a prior art video signal level chart representing the operation of the level control circuit 6 of FIG. 1. In the figure, the set position of the knob, namely the rotation angle of the knob controlling adjustment the ganged variable resistors, is taken on the abscissa, being indicated by rotation scales from (1) to (6), and the video signal level applied to the TV monitor 7 volts on the ordinate. It is assumed herein that the level of both of the infrared video signal 30 and the visible video signal 40 are taken maximum, namely equal to the threshold voltage. The dotted line shows the level of the infrared video signal, and the solid line the level of the visible video signal. It is easily understood by observing FIG. 3, that the sum of both output signal levels is always equal to the threshold voltage, and does not exceed the threshold voltage at any rotating scale where the knob of the variable resistor is positioned. This is a favorable feature of the video signal mixing device of the prior art shown in FIG. 2.

In practice, an increase in the brightness of the infrared image is followed by a decrease in that of the visible image and vice versa. This may be advantageous to select a favorable contrast between the infrared image and the visible image in the composite image. However, the ranges of the levels of the infrared video signal and the visible video signal are undesirably limited respectively within a narrow signal level range such as a half of the threshold voltage. The result is that all of the infrared, visible, and composite images are left vague to some degree, thus distinct recognition of images of the unusual points in the field of view, becomes difficult. The cause of the above problem lies in the mechanism that the infrared image is simply mixed with, or added to the visible image.

In view of the above described problem in the prior art there has been a need for an improved infrared/visible integrated device capable of displaying a clearer and more distinct composite image.

SUMMARY OF THE INVENTION

The object of the present invention is to provide an improved imaging apparatus that simultaneously displays a clear composite image composed of an infrared image of hot spots of an object to be observed and a visible image of the object.

Another object of the present invention is to provide a video signal mixing device employed in an infrared imaging apparatus, by which the levels of an infrared video signal and a visible video signal are adjustable independently, and the infrared image, superimposed upon the visible image, displayed on a screen is essentially distinct from the visible image displayed as the background.

A video signal mixing device according to the present invention superimposes a video signal produced by a visible camera, upon an infrared video signal produced by an infrared camera. The video signal mixing device contains a black level discriminating circuit, a visible video signal selecting circuit, and a mixing circuit. The black level discriminating circuit discriminates the infrared video signal having a level below the black level from the rest thereof. The visible video signal selecting circuit selectively extracts the visible video signal corresponding to the infrared video signal below the black level. The mixing circuit superimposes the selectively extracted visible video signal upon the infrared video signal.

The features and advantages of the present invention will be apparent by the following description and claims with reference to the following drawings wherein like reference numerals denote like parts.

BRIEF DESCRIPTION OF THE DRAWINGS

FIG. 4 is a block diagram for explaining the basic principles of the present invention;

FIGS. 5(a)–5(e) are diagrams illustrating waveforms of signals at different points of the block diagram of FIG. 4;

DESCRIPTION OF THE PREFERRED EMBODIMENT

Figure 1:
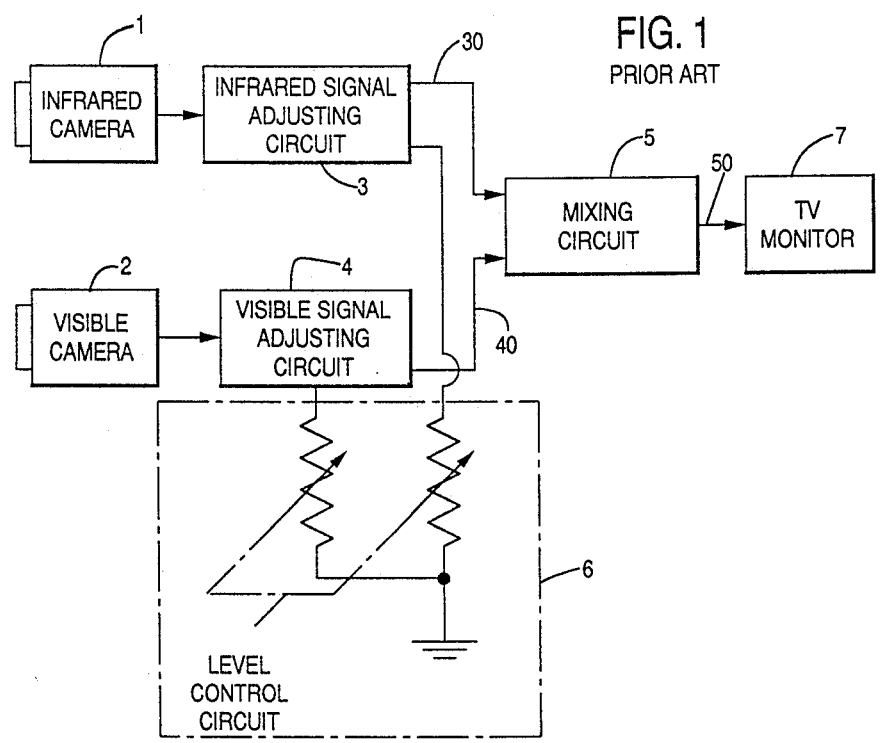
FIG. 1 is a block diagram illustrating a prior art video signal mixing device.
Figure 2A:
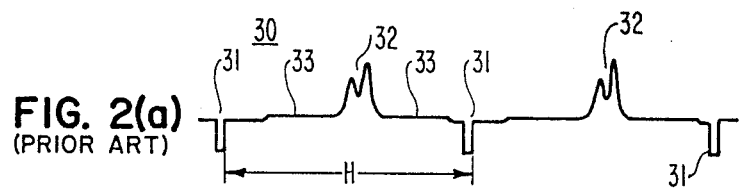
FIGS. 2(a)–2(c) are diagrams illustrating waveforms of signals at different points of the block diagram of FIG. 1.
Figure 2B:
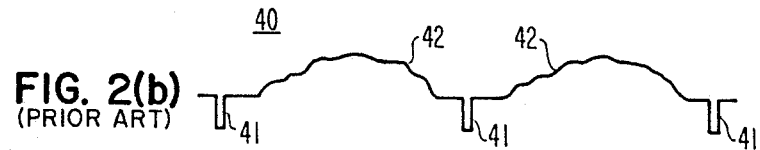
Figure 2C:
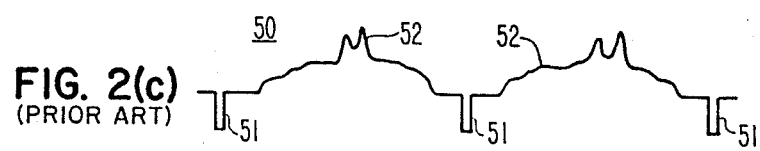
Figure 3:
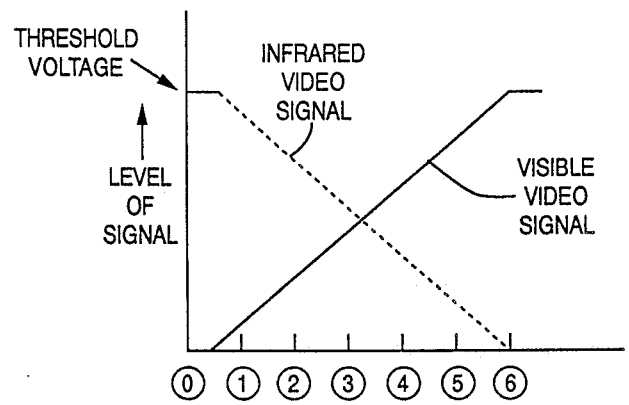
FIG. 3 is a level chart representing the characteristics of a prior art level control circuit.

FIG. 4 is a diagram for explaining the basic principles of the present invention. The video signal mixing device of the present invention superimposes a visible video signal of an object to be observed, produced by a visible camera 2, upon an infrared video signal produced by an infrared camera 1. The video signal mixing device comprises a black level discriminating circuit 8, a visible video signal selecting circuit 9, and a mixing circuit 5. The black level discriminating circuit 8 discriminates the infrared video signal, having a level below the black level, from the rest of the infrared video signal. The visible video signal selecting circuit 9 selectively extracts the visible video signal corresponding to the infrared video signal below the black level, and the mixing circuit 5 superimposes the selectively extracted visible video signal upon the infrared video signal.

FIG. 5(a) to FIG. 5(e) are diagrams illustrating the waveforms of video signals at different points of the block diagram of FIG. 4. FIG. 5(a) shows an infrared video signal 60, output from the infrared camera 1, which is composed of a horizontal synchronizing signal 61, a black level signal 63 indicating a low temperature portion of the object, and a profile signal 62 indicating a high temperature portion of the object. The black level discriminating circuit 8 receives and discriminates the infrared video signal 60, converting the results into a binary signal 70 composed of a high level signal 72 and low level signal 73 as shown in FIG. 5(b). The high level signal 72 indicates the presence of a high temperature portion of the object, and the low level signal 73 indicates the absence thereof. The horizontal scanning time interval is indicated by H, while duration times in the presence of the black level signal 63 and the profile signal 62 of the infrared signal 60 are respectively indicated by $H_0$ and $H_1$.

The visible video signal selecting circuit 9 selectively extracts parts of a visible video signal 80 produced by the visible camera 2 during the duration time $H_0$. As shown in FIG. 5(c), the extracted parts of visible video signal 180 correspond to the black level signal 63 of the infrared video signal 60. As a result, the parts of the visible video signal 80 corresponding to the high level signal 72 of the binary signal 70 are cut off. The output from the circuit 9 is the selected visible video signal 90 having the waveform shown in FIG. 5(d).

The selected visible video signal 90 output from the circuit 9, is superimposed upon the infrared video signal 60 in synchronization. The infrared video signal 60 and the video signal 80 has been originally synchronized using synchronizing signals 61 and 81 respectively included in video signals 60 and 80 using a conventional technique. Consequently, a composite video signal 100 is produced as shown in FIG. 5(e), displaying a composite image of the object on the screen of the TV monitor 7. The composite video signal 100 is composed of a horizontal synchronizing signal 101, an extracted visible video signal 102 superimposed upon the black level signal 63 of the infrared video signal 60, and a profile signal 105 corresponding to the profile signal 62 of the infrared video signal 60. As shown in FIG. 5(e), the levels of the profile signal 105 at both ends 106 thereof are substantially low, leaving a dark outline on the fringed portion of the image displayed on the TV monitor 7. However, in practice, the dark fringed pattern of the infrared image displayed on the screen is thin.

An embodiment according to the present invention is described in detail in the following with reference to drawings, FIG. 6 to FIG. 9. Description parts similar to previously described parts is omitted.

Figure 6:
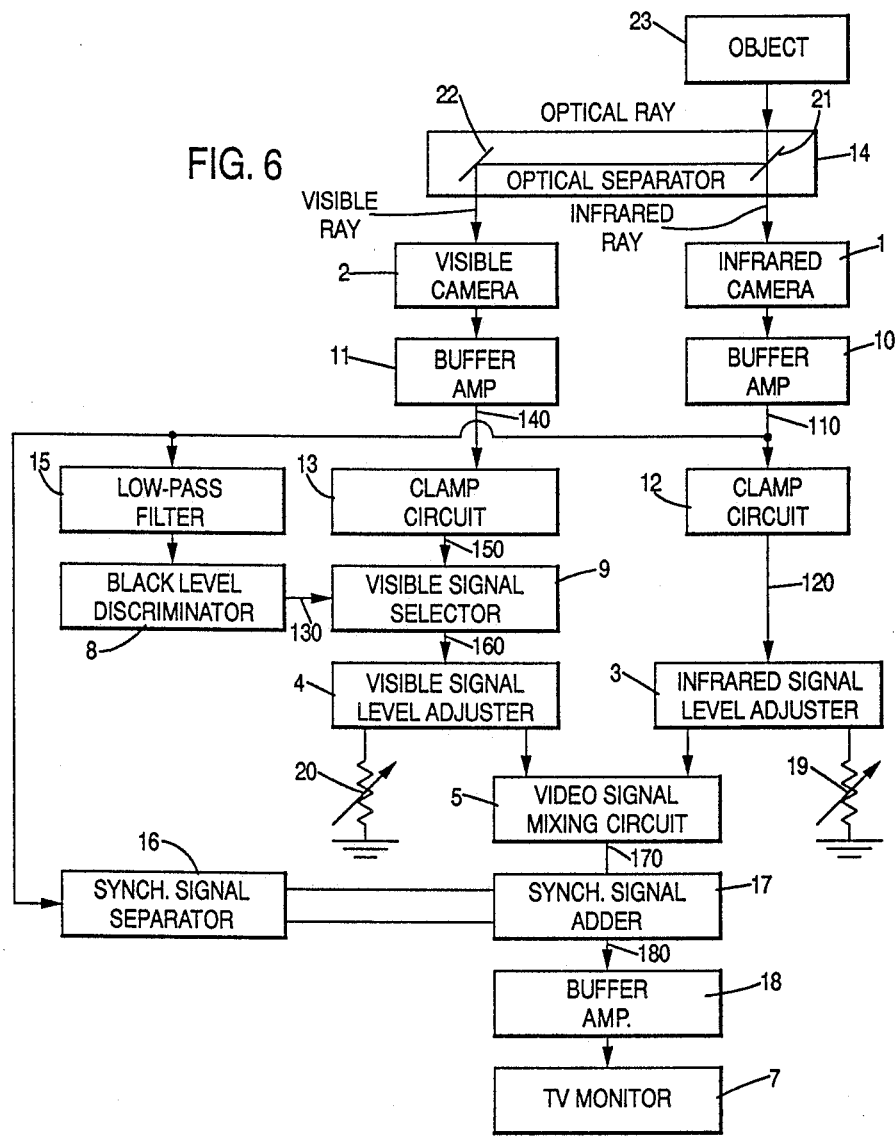
FIG. 6 is a block diagram illustrating an embodiment of the present invention.

FIG. 6 is a block diagram illustrating the preferred embodiment. Buffer amplifiers 10 and 11 amplify the outputs from an infrared camera 1 and a visible camera 2 respectively, clamping circuits 12 and 13 delete a horizontal synchronizing signal and a vertical synchronizing signal contained in the output signals from the buffer amplifiers 10 and 11. Optical separator 14 separates an incident optical ray into an infrared ray and a visible ray. Low-pass filter 15 filters and cuts off the noise components contained in the infrared video signal. Synchronizing signal separating circuit 16 extracts the horizontal synchronizing signal and vertical synchronizing signal contained in the infrared video signal. Synchronizing signal adding circuit 17 adds a horizontal synchronizing signal and a vertical synchronizing signal to the output signal of the mixing circuit 5. Buffer amplifier 18 buffer the input to TV monitor 17. Resistors 19 and 20 are used in the infrared video signal level adjusting circuit 3 and the visible video signal level adjusting circuit 4 respectively. Half mirror 21, disposed in the optical separator 14, transmits the infrared ray and the reflected visible ray. Reflecting mirror 22 is disposed at an angle of 45 degrees to the incident visible ray wherein 23 denotes an object to be observed. It should be noted that the variable resistors 19 and 20 are not ganged, as in the prior art with the result that both video signal level adjusting circuits 3 and 4 are operated independently of each other. This is one of the features of the present invention.

The operation of the device of FIG. 6 is described with reference to diagrams of FIG. 7(a) to FIG. 7(h), illustrating waveforms of video signals at different block stages of FIG. 6, being represented in a similar manner to those of FIG. 5. In the following, description and indication of the elements of the video signals, such as a profile signal, a synchronizing signal, and the like, are omitted except for those referred in the following description of the embodiment, since the elements are quite similar to those shown in FIG. 5.

The visible camera 2 has a zoom lens to adjust the size of the visible field of view thereof to coincide with that of the infrared camera 1. An optical ray radiated from the object 23, containing an infrared ray and a visible ray therein, is incident on the half mirror 21 through which the infrared ray is transmitted to the infrared camera 1, and by which the visible ray is deflected towards the reflecting mirror 22, which deflects the visible ray again toward the visible camera 2. Thus, the separated infrared ray and visible ray are respectively received by the infrared camera 1 and the visible camera 2, and converted to video signals by the cameras. Consequently, an infrared image and a visible image of the object are obtained with respect to a co-possessed common optical axis and the same field of view.

Figure 7A:
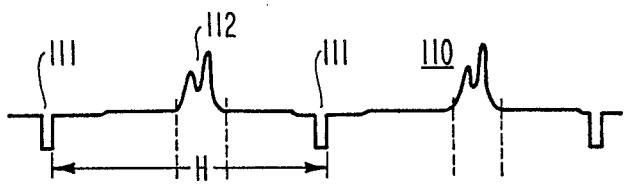
FIGS. 7(a)–7(h) are diagrams illustrating waveforms of signals at different points of the block diagram of FIG. 6.
Figure 7B:
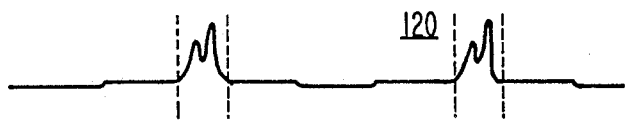

The infrared signal output from the infrared camera 1 is subject to impedance matching and amplified up to a predetermined level by the buffer amplifier 10. Thus the buffer amplifier outputs an infrared video signal 110 shown in FIG. 7(a). A profile signal 112 indicates the presence of a high temperature portion, namely a hot spot, in the object 23. The infrared video signal 110 is input to the clamping circuit 12 wherein the synchronizing signal 111 is removed as shown in FIG. 7(b), becoming an infrared video signal 120. The signal 120 is received by the infrared video signal level adjusting circuit 3, which is a variable gain amplifier. The level of the infrared video signal 120 is adjusted to a desired level through the infrared video signal level adjusting circuit 3, using the variable resistor 19 such that the level of the brightness of the associated portions at high temperature, namely the hot spots, of the infrared image displayed on the screen of the TV monitor 7 is set appropriately. Thereafter, the adjusted infrared signal is input to the mixing circuit 5.

Figure 8:
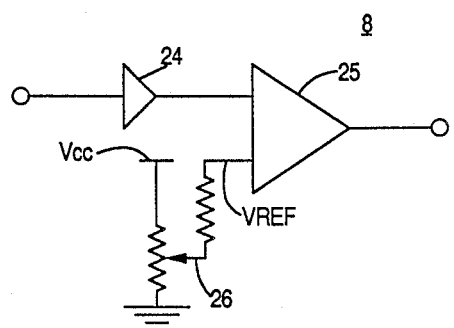
FIG. 8 is a diagram illustrating a black level discriminating circuit.
Figure 7C:
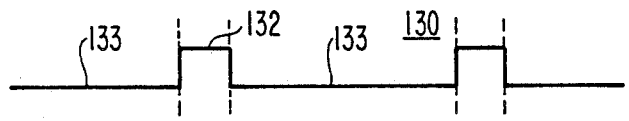

The infrared signal 110 is also input to the low-pass filter 15 to remove noise contained in the infrared signal 110. This is because, if a noise is contained in the infrared video signal 110, the noise will disturb the subsequent detection of the black level of the infrared video signal 110. Then the filtered infrared video signal 115 is input the black level discriminating circuit 8. The circuit 8 is composed of a buffer amplifier 24 and a comparator circuit 25 as shown in FIG. 8. The received noise-free infrared video signal 125 is compared with a reference voltage Vref obtained from Vcc via a variable resistor 26. As shown in FIG. 7(c), the black level discriminating circuit 8 issues a binary signal 130 comprising a high level signal 132 issued corresponding to the filtered infrared video signal 125 having a level higher than the reference voltage Vref, and a low level signal 133 corresponding to when signal 125 is lower than Vref. Using the variable resistor 26, the reference voltage Vref is set at any voltage corresponding to the black level required by the user of the imaging apparatus.

Figure 7D:
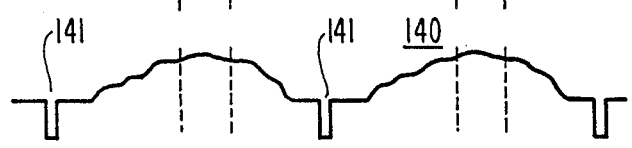
Figure 7E:
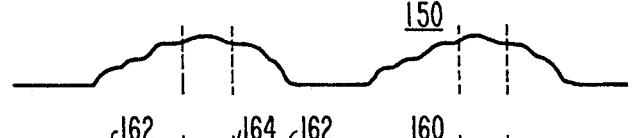

Meanwhile, the visible video signal produced by the visible camera 2 is synchronized with the infrared signal output from the infrared camera 1 using a conventional technology, and similarly amplified by the buffer amplifier 11 to output a visible video signal 140 shown in FIG. 7(d). The synchronizing signal 141 of the visible video signal 140 is removed by the clamping circuit 13 which outputs a visible video signal 150 shown in FIG. 7(e).

Figure 9:
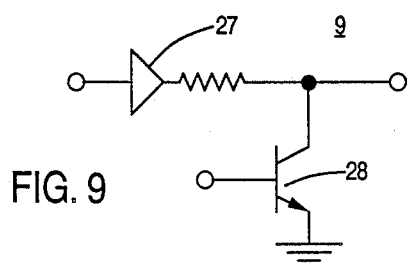
FIG. 9 is a diagram illustrating a visible video signal selecting circuit.
Figure 7F:
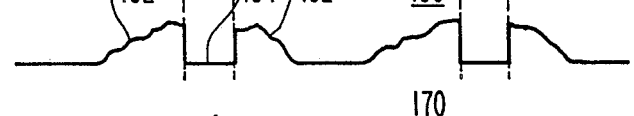

FIG. 9 is a diagram illustrating the visible video signal selecting circuit 9 composed of a buffer amplifier 27 and a transistor 28. The visible video signal 150 is fed to the buffer amplifier 27. The visible video signal 150, output from the buffer amplifier 27, is pulled down to the zero level of the visible video signal 164, when the high level signal 132 of the binary signal 130 from the circuit 8 is applied to the base of the transistor 28, enabling the transistor 28. When the low level signal 133 is applied, the transistor 28 is not enabled and the visible video signal 150 is output with no modification, as indicated by reference numeral 162, to the mixing circuit 5. Consequently, a visible video signal 160, having a profile visible video signal which is cut off at its center portion as shown in FIG. 7(f), is produced in the circuit 9. Thereafter, the level of the visible signal 160 is adjusted to a desired level with the visible video signal level adjusting circuit 4, and the adjusted infrared signal is output to the mixing circuit 5.

Figure 7G:
Figure 7H:
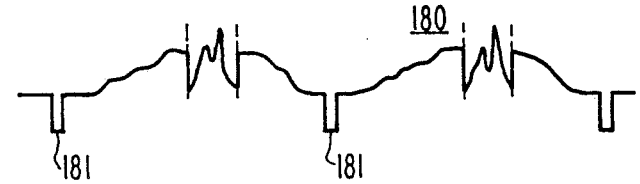

The mixing circuit 5 superimposes the visible video signal 160 upon the infrared signal 120 and adds both video signals to each other to produce a composite signal 170, having no synchronizing signal, as shown in FIG. 7(g). Vertical and horizontal synchronizing signals are selectively extracted from the infrared video signal 110 by the sychronizing signal separating circuit 16, and are added to the composite signal 170 output from the mixing circuit 5 through the synchronizing signal composite circuit 17. The composite signal 170 recovering synchronizing signals 181, is finally output as a composite signal 180 shown in FIG. 7(h), amplified by the buffer amplifier 18, applied to the TV monitor 7 and displayed on the screen thereof.

As described above, the synchronizing signals 111 and 141 respectively contained in the infrared video signal 110 and visible video signal 140, are removed before the superimposition of both video signals, otherwise the peak value of the horizontal synchronizing signal and vertical synchronizing signal of the superimposed signal are doubled, with an undesirable result to the circuit operation of the TV monitor 7.

As described above in detail, in the imaging apparatus employing a mixing device according to the present invention, the level of both the infrared video signal and the visible video signal can be selected within a wide signal level range, ranging from the black level to the threshold voltage. This means that the brightness of each of the visible image and the infrared image displayed on the screen of the relevant TV monitor, is adjustable independently of each other, and in full range of the image brightness ranging from the uppermost brightness (producing a whitish image) to black. As a result, the obtained composite image is clear and distinct--favorable to detect a portion of the object which is unusually at high temperature. This realizes the elevation of the capability of pattern recognition of the composite imaging apparatus.

Furthermore, the visual image which is usually providing a background image with respect to the hot spots, can be lowered to a desired lower level, if so required, to make the image of the hot spots more distinct with clear contrast. This results in a quick and easy detection and location of the hot spots. Such adjustment of the brightness of the background of the composite image is possible since the level of the infrared video signal and that of the visible video signal can be adjusted independently of each other.

The feature of the present invention is observed in a different aspect, namely, in the aspect of the infrated/visible composite image displayed on the screen of the TV monitor. A part of the visible image displayed on the screen is selectively cut off from the area on the screen where the infrared image having a higher, image level (brightness) than the black level is present, and the rest part of the visual image is superimposed upon the infrared image. In addition, the brightness levels of both images are independently adjustable of each other. These features of the present invention produce a substantial advantage that a clear and distinct image of the object is obtained.

The video signal mixing device of FIG. 6 is an analog device, in which the infrared video signal and the visible video signal produced by both cameras are analog signals subject to analog signal processing. However, the infrared and visible video signals can be digitally processed.

For example, digital processing is described with respect to a digital device modified from the device of FIG. 6 The infrared video signal 120 and visible video signal 150 output from the clamping circuits 12 and 13, are respectively subject to analog to digital conversion through each A/D converter, being converted to digital signals, namely digital infrared video signals and digital visible video signals. These digital signals are stored separately in digital storage devices. The digital signals stored in the storage devices are digitally processed to form a composite image on the screen of the TV monitor 7 employing conventional digital technology. In the digital processing, the black level is represented by a specified number of the digital signals of the infrared video signal. If the number of the digital infrared video signals is higher than the specified number, then the digital infrared video signals are output from the relevant storage device, and if the number of the digital infrared video signals is lower than the specified number, then the digital visible video signals stored in the relevant storage device are output. The digital infrared video signals and the digital visible video signals output are subject to digital to analog conversion through conventional D/A converters, being converted to an analog infrared video signal and an analog visible video signal which are applied to the TV monitor 7, and displayed on the screen as infrared/visible composite image.

In the above description, the application field was limited to a monitoring system for monitoring an extensive area. However, the application field is not limited to such monitoring, but applicable to various fields, for example, to a medical apparatus for detecting a cancerous growth below the skin of a human body.

The many features and advantages of the present invention are apparent from the detailed specification and thus, it is intended by the appended claims, to cover all such features and advantages of the apparatus which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be restored to falling within the scope and spirit of the invention.

What we claim is:

1. A video signal mixing device for superimposing a visible video signal output from a visible camera and an infrared video signal output from an infrared camera, both said cameras being focused on a common object, said video signal mixing device comprising:

a black level discriminating circuit for discriminating a first part of said infrared video signal lower than a predetermined black level from a second part of said infrared video signal higher than said predetermined black level;

a visible video selecting circuit for enabling output of said visible video signal during the presence of said first part of said infrared video signal lower than said predetermined black level, and selectively disabling output of said visible video signal during the presence of said second part of said infrared video signal higher than said predetermined black level; and a mixing circuit for superimposing said visible video signal, output from said visible video selecting circuit, and said infrared video signal.

2. A video signal mixing device as recited in claim 1, wherein said visible video signal is output from said visible camera in synchronization with said infrared video signal output from said infrared camera.

3. A video signal mixing device as recited in claim 1, wherein said black level discriminating circuit issues a binary signal comprising a first signal indicating presence of said infrared video signal having a level higher than said predetermined black level, and a second signal indicating presence of said infrared video signal having a level lower than said predetermined black level.

4. A video signal mixing device as recited in claim 3, wherein said visible video signal selecting circuit disables output of said visible video signal during presence of said first signal of said binary signal.

5. A video signal mixing device as recited in claim 1, further comprising:

an infrared video signal level adjusting circuit for receiving said infrared video signal from said infrared camera and adjusting the level of said infrared video signal to a level within a first range between the predetermined black level and a threshold level where brightness of a first image resulting from said infrared video signal is at maximum; and a visible video signal level adjusting circuit for receiving said visible video signal from said visible camera and adjusting the level of said visible video signal to a level within a second range between the predetermined black level and a level where brightness of a second image resulting from said visible video signal is at maximum, said infrared video signal level and said visible video signal level are capable of independent adjustment.

6. A video signal mixing device as recited in claim 5, further comprising:

a low-pass filter, operatively connected to said infrared camera and to said black level discriminating circuit, for filtering said infrared signal from said infrared camera to eliminate electrical noises contained in said infrared video signal.

7. A video signal mixing device as recited in claim 1, further comprising:

a low-pass filter, operatively connected to said infrared camera and to said black level discriminating circuit, for filtering said infrared signal from said infrared camera to eliminate electrical noises contained in said infrared video signal.

8. A video signal mixing method for superimposing a visible video signal output from a visible camera and an infrared video signal output from an infrared camera, both of the cameras viewing a common object, said video signal mixing method comprising the steps of:

(a) discriminating a first part of the infrared video signal lower than a predetermined black level from a second part of the infrared video signal higher than the predetermined black level;

(b) enabling output of the visible video signal during the existance of said first part of the infrared video signal lower than the predetermined black level;

(c) disabling output of the visible video signal during the presence of the second part of the infrared video signal higher than the predetermined black level; and (d) superimposing the visible video signal when output enabled and the infrared video signal.

9. A method as recited in claim 8, further comprising the step of:

(e) outputting the visible video signal in synchronization with the infrared video signal.

10. A method as recited in claim 8, wherein step (a) further comprises the steps of:

(e) issuing a binary signal comprising a first signal indicating the infrared video signal having a level higher than the predetermined black level, and a second signal indicating the infrared video signal having a level lower than the predetermined black level.

11. A method as recited in claim 10, wherein step (c) disables output of the visible video signal when said first signal indicates the infrared video signal has a level higher than the predetermined black level.

12. A method as recited in claim 8, further comprising the steps of:

(e) receiving the infrared video signal from the infrared camera;

(f) adjusting the infrared video signal to a level within a first range between the predetermined black level and a level where brightness of a first image resulting from the infrared video signal is at maximum;

(g) receiving the visible video signal from the visible camera; and (h) adjusting the level of the visible video signal to a level within a second range between the predetermined black level and a level where brightness of a second image resulting from said visible video signal is at maximum.

13. A method as recited in claim 12, further comprising the step of:

(i) filtering out electrical noise contained in the infrared video signal received from the infrared camera.

* * * * *